(12) United States Patent
Hahn-Carlson (10) Patent No.: US 8,751,337 B2
(45) Date of Patent: Jun. 10, 2014

(54) INVENTORY-BASED PAYMENT PROCESSING SYSTEM AND APPROACH

(75) Inventor: Dean W. Hahn-Carlson, Lilydale, MN (US)

(73) Assignee: Syncada LLC, Minneapolis, MN (US)

( * ) Notice: Subject to any disclaimer, the term of this patent is extended or adjusted under 35 U.S.C. 154(b) by 1334 days.

(21) Appl. No.: 12/020,198

(22) Filed: Jan. 25, 2008

(65) Prior Publication Data

US 2009/0192922 A1 Jul. 30, 2009

(51) Int. Cl.
- *G07B 17/00* (2006.01)
- *G07F 19/00* (2006.01)
- *G06Q 20/00* (2012.01)
- *G06G 1/14* (2006.01)
- *G06Q 10/00* (2012.01)

(52) U.S. Cl.
USPC .................... 705/30; 705/16; 705/22; 705/28

(58) Field of Classification Search
USPC .......................................... 705/16, 22, 28, 30
See application file for complete search history.

(56) References Cited

U.S. PATENT DOCUMENTS

| | | | |
|---|---|---|---|
| 4,114,027 A | 9/1978 | Slater et al. | |
| 4,270,042 A | 5/1981 | Case | |
| 4,305,059 A | 12/1981 | Benton | |
| 4,412,287 A | 10/1983 | Braddock, III | |
| 4,507,778 A | 3/1985 | Tan | |
| 4,567,359 A | 1/1986 | Lockwood | |
| 4,713,761 A | 12/1987 | Sharpe et al. | |
| 4,725,719 A | 2/1988 | Oncken et al. | |
| 4,750,119 A | 6/1988 | Cohen et al. | |
| 4,799,156 A | 1/1989 | Shavit et al. | |
| 4,926,325 A | 5/1990 | Benton et al. | |
| 4,949,272 A | 8/1990 | Vanourek et al. | |
| 4,960,981 A | 10/1990 | Benton et al. | |
| 4,992,940 A | 2/1991 | Dworkin | |
| 4,995,112 A | 2/1991 | Aoyama | |
| 4,996,662 A | 2/1991 | Cooper et al. | |
| 5,008,827 A | 4/1991 | Sansone et al. | |
| 5,017,766 A | 5/1991 | Tamada et al. | |
| 5,025,372 A | 6/1991 | Burton et al. | |

(Continued)

FOREIGN PATENT DOCUMENTS

| | | | |
|---|---|---|---|
| EP | 0339850 A2 | 2/1989 | |
| EP | 0407026 A2 | 1/1991 | |

(Continued)

OTHER PUBLICATIONS

European Response from corresponding European Patent Application Serial No. 09703477.1 filed on Dec. 3, 2012 (11 pages).

(Continued)

*Primary Examiner* — Ig T An (74) *Attorney, Agent, or Firm* — Shumaker & Sieffert, P.A.

(57) ABSTRACT

Transaction management for financial institution-based transactions is facilitated in various example embodiments. According to one such embodiment, a transaction management approach involves the processing of financial aspects of a transaction using transaction rules associated with a buyer for auditing the transaction and any associated invoices. A processor arrangement processes transactions for merchant offerings subject to a related set of inventory data by auditing the transactions relative to inventory data corresponding to an inventory to which the transaction applies and stored contract data for the transaction, by processing payment in response thereto, and by assessing a processing fee against one or more parties to the transaction.

21 Claims, 3 Drawing Sheets

(56) References Cited

U.S. PATENT DOCUMENTS

| | | |
|---|---|---|
| 5,040,132 A | 8/1991 | Schuricht et al. |
| 5,043,908 A | 8/1991 | Manduley et al. |
| 5,054,096 A | 10/1991 | Beizer |
| 5,077,694 A | 12/1991 | Sansone et al. |
| 5,117,364 A | 5/1992 | Barns-Slavin et al. |
| 5,151,948 A | 9/1992 | Lyke |
| 5,153,842 A | 10/1992 | Dlugos, Sr. et al. |
| 5,159,667 A | 10/1992 | Borrey et al. |
| 5,161,109 A | 11/1992 | Keating et al. |
| 5,168,444 A | 12/1992 | Cukor et al. |
| 5,175,416 A | 12/1992 | Mansvelt et al. |
| 5,208,446 A | 5/1993 | Martinez |
| 5,218,188 A | 6/1993 | Hanson |
| 5,220,501 A | 6/1993 | Lawlor et al. |
| 5,222,018 A | 6/1993 | Sharpe et al. |
| 5,231,569 A | 7/1993 | Myatt et al. |
| 5,238,349 A | 8/1993 | Grace, Sr. |
| 5,285,383 A | 2/1994 | Lingrey et al. |
| 5,293,310 A | 3/1994 | Carroll et al. |
| 5,329,589 A | 7/1994 | Fraser et al. |
| 5,334,823 A | 8/1994 | Noblett, Jr. et al. |
| 5,334,824 A | 8/1994 | Martinez |
| 5,337,246 A | 8/1994 | Carroll et al. |
| 5,357,563 A | 10/1994 | Hamilton et al. |
| 5,393,963 A | 2/1995 | Thomas et al. |
| 5,426,281 A | 6/1995 | Abecassis |
| 5,440,634 A | 8/1995 | Jones et al. |
| 5,483,445 A | 1/1996 | Pickering |
| 5,485,369 A | 1/1996 | Nicholls et al. |
| 5,500,513 A | 3/1996 | Langhans et al. |
| 5,631,821 A | 5/1997 | Muso |
| 5,631,827 A | 5/1997 | Nicholls et al. |
| 5,652,749 A | 7/1997 | Davenport et al. |
| 5,666,493 A | 9/1997 | Wojcik et al. |
| 5,671,362 A | 9/1997 | Cowe et al. |
| 5,677,955 A | 10/1997 | Doggett et al. |
| 5,694,334 A | 12/1997 | Donahue et al. |
| 5,694,551 A | 12/1997 | Doyle et al. |
| 5,699,528 A | 12/1997 | Hogan |
| 5,712,990 A | 1/1998 | Henderson |
| 5,717,989 A | 2/1998 | Tozzoli et al. |
| 5,719,771 A | 2/1998 | Buck et al. |
| 5,732,400 A | 3/1998 | Mandler |
| 5,754,854 A | 5/1998 | Kanamori et al. |
| 5,770,844 A | 6/1998 | Henn |
| 5,774,170 A | 6/1998 | Hite et al. |
| 5,790,790 A | 8/1998 | Smith et al. |
| 5,794,207 A | 8/1998 | Walker et al. |
| 5,799,286 A | 8/1998 | Morgan et al. |
| 5,806,063 A | 9/1998 | Dickens |
| 5,842,178 A | 11/1998 | Giovannoli |
| 5,845,283 A | 12/1998 | Williams |
| 5,870,719 A | 2/1999 | Maritzen et al. |
| 5,892,900 A | 4/1999 | Ginter et al. |
| 5,893,080 A | 4/1999 | McGurl et al. |
| 5,896,530 A | 4/1999 | White |
| 5,897,645 A | 4/1999 | Watters |
| 5,910,896 A | 6/1999 | Hahn-Carlson |
| 5,917,830 A | 6/1999 | Chen et al. |
| 5,918,216 A | 6/1999 | Miksovsky et al. |
| 5,918,229 A | 6/1999 | Davis et al. |
| 5,920,847 A | 7/1999 | Kolling et al. |
| 5,924,082 A | 7/1999 | Silverman et al. |
| 5,930,363 A | 7/1999 | Stanford et al. |
| 5,931,917 A | 8/1999 | Nguyen et al. |
| 5,943,670 A | 8/1999 | Prager et al. |
| 5,956,690 A | 9/1999 | Haggerson et al. |
| 5,956,700 A | 9/1999 | Landry |
| 5,960,407 A | 9/1999 | Vivona |
| 5,970,475 A * | 10/1999 | Barnes et al. ............... 705/26.35 |
| 5,973,685 A | 10/1999 | Schaffa et al. |
| 5,978,567 A | 11/1999 | Rebane et al. |
| 5,982,891 A * | 11/1999 | Ginter et al. .................... 705/54 |
| 5,987,506 A | 11/1999 | Carter et al. |
| 5,991,728 A | 11/1999 | Debusk et al. |
| 5,991,801 A | 11/1999 | Rebec et al. |
| 5,995,976 A | 11/1999 | Walker et al. |
| 6,012,041 A | 1/2000 | Brewer et al. |
| 6,016,477 A | 1/2000 | Ehnebuske et al. |
| 6,021,202 A | 2/2000 | Anderson et al. |
| 6,026,374 A | 2/2000 | Chess |
| 6,029,140 A | 2/2000 | Martin et al. |
| 6,029,150 A | 2/2000 | Kravitz |
| 6,043,819 A | 3/2000 | LeBrun et al. |
| 6,044,362 A | 3/2000 | Neely |
| 6,047,268 A | 4/2000 | Bartoli et al. |
| 6,055,519 A | 4/2000 | Kennedy et al. |
| 6,058,380 A | 5/2000 | Anderson et al. |
| 6,070,150 A | 5/2000 | Remington et al. |
| 6,085,200 A | 7/2000 | Hill et al. |
| 6,097,834 A | 8/2000 | Krouse et al. |
| 6,115,649 A | 9/2000 | Sakata |
| 6,115,711 A | 9/2000 | White |
| 6,119,163 A | 9/2000 | Monteiro et al. |
| 6,128,602 A | 10/2000 | Northington et al. |
| 6,131,087 A | 10/2000 | Luke et al. |
| 6,141,653 A | 10/2000 | Conklin et al. |
| 6,151,588 A | 11/2000 | Tozzoli et al. |
| 6,157,924 A | 12/2000 | Austin |
| 6,167,378 A | 12/2000 | Webber, Jr. |
| 6,169,542 B1 | 1/2001 | Hooks et al. |
| 6,199,046 B1 | 3/2001 | Heinzle et al. |
| 6,204,763 B1 | 3/2001 | Sone |
| 6,209,095 B1 | 3/2001 | Anderson et al. |
| 6,223,168 B1 | 4/2001 | McGurl et al. |
| 6,236,972 B1 | 5/2001 | Shkedy |
| 6,246,994 B1 | 6/2001 | Wolven et al. |
| 6,254,000 B1 | 7/2001 | Degen et al. |
| 6,260,024 B1 * | 7/2001 | Shkedy ........................ 705/37 |
| 6,266,640 B1 | 7/2001 | Fromm et al. |
| 6,267,292 B1 | 7/2001 | Walker et al. |
| 6,275,813 B1 | 8/2001 | Berka |
| 6,285,916 B1 | 9/2001 | Kadaba et al. |
| 6,317,737 B1 | 11/2001 | Gorelik et al. |
| 6,323,894 B1 | 11/2001 | Katz et al. |
| 6,324,522 B2 | 11/2001 | Peterson et al. |
| 6,324,551 B1 | 11/2001 | Lamping et al. |
| 6,330,550 B1 | 12/2001 | Brisebois et al. |
| 6,338,044 B1 | 1/2002 | Cook et al. |
| 6,357,042 B2 | 3/2002 | Srinivasan et al. |
| 6,366,829 B1 | 4/2002 | Wallace |
| 6,381,587 B1 | 4/2002 | Guzelsu |
| 6,389,402 B1 | 5/2002 | Ginter et al. |
| 6,418,441 B1 | 7/2002 | Call |
| 6,421,691 B1 | 7/2002 | Kajitani |
| 6,442,533 B1 | 8/2002 | Hinkle |
| 6,477,510 B1 | 11/2002 | Johnson |
| 6,486,899 B1 | 11/2002 | Bush et al. |
| 6,490,567 B1 | 12/2002 | Gregory |
| 6,493,685 B1 | 12/2002 | Ensel et al. |
| 6,499,036 B1 | 12/2002 | Gurevich |
| 6,505,169 B1 | 1/2003 | Bhagavath et al. |
| 6,505,172 B1 | 1/2003 | Johnson et al. |
| 6,507,826 B1 | 1/2003 | Maners |
| 6,510,383 B1 | 1/2003 | Jones |
| 6,510,384 B2 | 1/2003 | Okano |
| 6,526,443 B1 | 2/2003 | Goldsmith et al. |
| 6,539,360 B1 | 3/2003 | Kadaba |
| 6,571,149 B1 | 5/2003 | Hahn-Carlson |
| 6,598,026 B1 | 7/2003 | Ojha et al. |
| 6,607,081 B2 | 8/2003 | Ojha et al. |
| 6,629,081 B1 | 9/2003 | Cornelius et al. |
| 6,673,479 B2 | 1/2004 | McArthur et al. |
| 6,684,384 B1 | 1/2004 | Bickerton et al. |
| 6,687,713 B2 | 2/2004 | Mattson et al. |
| 6,697,702 B1 | 2/2004 | Hahn-Carlson |
| 6,704,612 B1 | 3/2004 | Hahn-Carlson |
| 6,721,613 B1 | 4/2004 | Yamamoto et al. |
| 6,721,715 B2 | 4/2004 | Nemzow |
| 6,741,968 B2 | 5/2004 | Jacoves et al. |
| 6,751,630 B1 | 6/2004 | Franks et al. |
| 6,785,661 B1 | 8/2004 | Mandler et al. |
| 6,789,252 B1 | 9/2004 | Burke et al. |
| 6,792,459 B2 | 9/2004 | Elnozahy et al. |

(56) References Cited

U.S. PATENT DOCUMENTS

| | | |
|---|---|---|
| 6,820,038 B1 | 11/2004 | Wetzer et al. |
| 6,829,590 B1 | 12/2004 | Greener et al. |
| 6,832,212 B1 | 12/2004 | Zenner et al. |
| 6,833,865 B1 | 12/2004 | Fuller et al. |
| 6,850,900 B1 | 2/2005 | Hare et al. |
| 6,873,963 B1 | 3/2005 | Westbury et al. |
| 6,873,997 B1 | 3/2005 | Majjasie et al. |
| 6,879,962 B1 | 4/2005 | Smith et al. |
| 6,882,983 B2 | 4/2005 | Furphy et al. |
| 6,882,986 B1 | 4/2005 | Heinemann et al. |
| 6,889,194 B1 | 5/2005 | Kadaba |
| 6,895,438 B1 | 5/2005 | Ulrich |
| 6,915,268 B2 | 7/2005 | Riggs et al. |
| 6,937,992 B1 | 8/2005 | Benda et al. |
| 6,941,281 B1 | 9/2005 | Johnson |
| 6,944,595 B1 | 9/2005 | Graser et al. |
| 6,973,258 B1 | 12/2005 | Yoo et al. |
| 6,983,278 B1 | 1/2006 | Yu et al. |
| 6,988,111 B2 | 1/2006 | Chow et al. |
| 6,999,943 B1 | 2/2006 | Johnson et al. |
| 7,047,210 B1 | 5/2006 | Srinivasan |
| 7,054,841 B1 | 5/2006 | Tenorio |
| 7,069,234 B1 | 6/2006 | Cornelius et al. |
| 7,069,248 B2 | 6/2006 | Huber |
| 7,076,652 B2 | 7/2006 | Ginter et al. |
| 7,079,176 B1 | 7/2006 | Freeman et al. |
| 7,099,304 B2 | 8/2006 | Liu et al. |
| 7,110,959 B2 | 9/2006 | Hahn-Carlson |
| 7,110,979 B2 | 9/2006 | Tree |
| 7,113,964 B1 | 9/2006 | Bequet et al. |
| 7,117,170 B1 | 10/2006 | Bennett et al. |
| 7,120,871 B1 | 10/2006 | Harrington |
| 7,124,150 B2 | 10/2006 | Majjasie et al. |
| 7,130,822 B1 | 10/2006 | Their et al. |
| 7,131,069 B1 | 10/2006 | Rush et al. |
| 7,133,835 B1 | 11/2006 | Fusz et al. |
| 7,136,467 B2 | 11/2006 | Brockman et al. |
| 7,143,058 B2 | 11/2006 | Sugimoto et al. |
| 7,146,337 B1 | 12/2006 | Ward et al. |
| 7,149,744 B1 | 12/2006 | Tenorio |
| 7,162,458 B1 | 1/2007 | Flanagan et al. |
| 7,177,836 B1 | 2/2007 | German et al. |
| 7,181,017 B1 | 2/2007 | Nagel et al. |
| 7,203,662 B2 | 4/2007 | Das et al. |
| 7,206,768 B1 | 4/2007 | DeGroeve et al. |
| 7,222,081 B1 | 5/2007 | Sone |
| 7,243,139 B2 | 7/2007 | Ullman et al. |
| 7,254,588 B2 | 8/2007 | Sung et al. |
| 7,257,560 B2 | 8/2007 | Jacobs et al. |
| 7,263,506 B2 | 8/2007 | Lee et al. |
| 7,324,976 B2 | 1/2008 | Gupta et al. |
| 7,327,952 B2 | 2/2008 | Enomoto |
| 7,340,433 B1 | 3/2008 | Kay et al. |
| 7,346,575 B1 | 3/2008 | Ahles et al. |
| 7,363,261 B2 | 4/2008 | Whitehead et al. |
| 7,366,684 B1 | 4/2008 | Douglas |
| 7,373,365 B2 | 5/2008 | Varadarajan et al. |
| 7,386,502 B1 | 6/2008 | Butcher, III |
| 7,392,934 B2 | 7/2008 | Hahn-Carlson et al. |
| 7,415,471 B1 | 8/2008 | Coleman |
| 7,415,617 B2 | 8/2008 | Ginter et al. |
| 7,433,845 B1 | 10/2008 | Flitcroft et al. |
| 7,437,310 B1 | 10/2008 | Dutta |
| 7,448,063 B2 | 11/2008 | Freeman et al. |
| 7,475,024 B1 | 1/2009 | Phan |
| 7,496,519 B2 | 2/2009 | Hahn-Carlson et al. |
| 7,499,875 B1 | 3/2009 | May et al. |
| 7,529,706 B2 | 5/2009 | Kulasooriya et al. |
| 7,536,354 B1 | 5/2009 | DeGroeve et al. |
| 7,536,362 B2 | 5/2009 | Starr et al. |
| 7,548,884 B1 | 6/2009 | Thomas |
| 7,558,793 B1 | 7/2009 | Topolovac et al. |
| 7,574,363 B2 | 8/2009 | Bodin |
| 7,574,386 B2 | 8/2009 | Hahn-Carlson et al. |
| 7,587,363 B2 | 9/2009 | Cataline et al. |
| 7,590,575 B2 | 9/2009 | Yu et al. |
| 7,617,146 B2 | 11/2009 | Keaton et al. |
| 7,627,499 B2 | 12/2009 | Hahn-Carlson |
| 7,634,455 B1 | 12/2009 | Keene et al. |
| 7,640,195 B2 | 12/2009 | Von Zimmermann et al. |
| 7,660,788 B1 | 2/2010 | Clark |
| 7,693,791 B2 | 4/2010 | Hahn-Carlson et al. |
| 7,702,563 B2 | 4/2010 | Balson et al. |
| 7,725,372 B2 | 5/2010 | Hahn-Carlson |
| 7,765,136 B2 | 7/2010 | Northington et al. |
| 7,822,653 B2 | 10/2010 | Hahn-Carlson et al. |
| 7,890,395 B2 | 2/2011 | Phelan |
| 7,925,551 B2 | 4/2011 | Hahn-Carlson et al. |
| 7,970,671 B2 | 6/2011 | Hahn-Carlson et al. |
| 8,050,938 B1 | 11/2011 | Green et al. |
| 8,060,410 B2 | 11/2011 | Hahn-Carlson |
| 8,069,054 B2 | 11/2011 | Hahn-Carlson et al. |
| 8,103,575 B1 | 1/2012 | Hinkle |
| 8,126,785 B2 | 2/2012 | Hahn-Carlson et al. |
| 8,266,024 B2 * | 9/2012 | Hahn-Carlson et al. ........ 705/34 |
| 8,392,285 B2 * | 3/2013 | Hahn-Carlson ............. 705/26.8 |
| 8,396,811 B1 * | 3/2013 | Hahn-Carlson ................ 705/75 |
| 2001/0009002 A1 | 7/2001 | Logan et al. |
| 2001/0011241 A1 | 8/2001 | Nemzow |
| 2001/0014878 A1 | 8/2001 | Mitra |
| 2001/0025262 A1 | 9/2001 | Ahmed |
| 2001/0032154 A1 | 10/2001 | Schummer |
| 2001/0032171 A1 | 10/2001 | Brink et al. |
| 2001/0032183 A1 | 10/2001 | Landry |
| 2001/0039522 A1 | 11/2001 | Saxon |
| 2001/0047311 A1 | 11/2001 | Singh |
| 2001/0056395 A1 * | 12/2001 | Khan ............................. 705/37 |
| 2002/0007302 A1 | 1/2002 | Work et al. |
| 2002/0016765 A1 | 2/2002 | Sacks |
| 2002/0026374 A1 | 2/2002 | Moneymaker et al. |
| 2002/0032649 A1 | 3/2002 | Selvarajan |
| 2002/0035488 A1 | 3/2002 | Aquila et al. |
| 2002/0038277 A1 | 3/2002 | Yuan |
| 2002/0038305 A1 | 3/2002 | Bahl et al. |
| 2002/0040304 A1 | 4/2002 | Shenoy et al. |
| 2002/0042782 A1 | 4/2002 | Albazz et al. |
| 2002/0046081 A1 | 4/2002 | Albazz et al. |
| 2002/0046125 A1 | 4/2002 | Speicher et al. |
| 2002/0046147 A1 | 4/2002 | Livesay et al. |
| 2002/0046169 A1 | 4/2002 | Keresman et al. |
| 2002/0048369 A1 | 4/2002 | Ginter et al. |
| 2002/0049622 A1 | 4/2002 | Lettich et al. |
| 2002/0055850 A1 | 5/2002 | Powell et al. |
| 2002/0059122 A1 | 5/2002 | Inoue et al. |
| 2002/0059134 A1 | 5/2002 | Ebbs et al. |
| 2002/0062278 A1 | 5/2002 | Ingram et al. |
| 2002/0065736 A1 | 5/2002 | Willner et al. |
| 2002/0065738 A1 | 5/2002 | Riggs et al. |
| 2002/0069177 A1 | 6/2002 | Carrott et al. |
| 2002/0072956 A1 | 6/2002 | Willems et al. |
| 2002/0077978 A1 | 6/2002 | O'Leary et al. |
| 2002/0087344 A1 | 7/2002 | Billings et al. |
| 2002/0087455 A1 | 7/2002 | Tsagarakis |
| 2002/0095355 A1 | 7/2002 | Walker et al. |
| 2002/0103661 A1 | 8/2002 | Albazz et al. |
| 2002/0107761 A1 | 8/2002 | Kark et al. |
| 2002/0107794 A1 * | 8/2002 | Furphy et al. ................... 705/40 |
| 2002/0111886 A1 | 8/2002 | Chenevich et al. |
| 2002/0116288 A1 | 8/2002 | Nakajima |
| 2002/0116334 A1 | 8/2002 | Bennett et al. |
| 2002/0116348 A1 | 8/2002 | Phillips et al. |
| 2002/0120570 A1 | 8/2002 | Loy |
| 2002/0123919 A1 | 9/2002 | Brockman et al. |
| 2002/0123973 A1 | 9/2002 | Eccles et al. |
| 2002/0143858 A1 | 10/2002 | Teague et al. |
| 2002/0147655 A1 | 10/2002 | Say |
| 2002/0156797 A1 | 10/2002 | Lee et al. |
| 2002/0161719 A1 | 10/2002 | Manning et al. |
| 2002/0174034 A1 | 11/2002 | Au et al. |
| 2002/0184527 A1 | 12/2002 | Chun et al. |
| 2002/0194174 A1 | 12/2002 | Calkins et al. |
| 2002/0198829 A1 | 12/2002 | Ludwig et al. |
| 2002/0198833 A1 | 12/2002 | Wohlstadter |
| 2003/0004823 A1 | 1/2003 | Sagy |

(56) References Cited

U.S. PATENT DOCUMENTS

| | | |
|---|---|---|
| 2003/0005876 A1 | 1/2003 | Boswell |
| 2003/0014325 A1 | 1/2003 | Biffar et al. |
| 2003/0018563 A1 | 1/2003 | Kilgour et al. |
| 2003/0026404 A1 | 2/2003 | Joyce et al. |
| 2003/0033205 A1 | 2/2003 | Nowers et al. |
| 2003/0033240 A1 | 2/2003 | Balson et al. |
| 2003/0041008 A1 | 2/2003 | Grey et al. |
| 2003/0046089 A1 | 3/2003 | Menninger et al. |
| 2003/0050876 A1 | 3/2003 | Tawara et al. |
| 2003/0055675 A1 | 3/2003 | Klein Twennaar |
| 2003/0055779 A1 | 3/2003 | Wolf |
| 2003/0055783 A1 | 3/2003 | Cataline et al. |
| 2003/0074206 A1 | 4/2003 | Hoffman et al. |
| 2003/0074298 A1* | 4/2003 | Daum .......................... 705/37 |
| 2003/0093320 A1 | 5/2003 | Sullivan |
| 2003/0097318 A1 | 5/2003 | Yu et al. |
| 2003/0115129 A1 | 6/2003 | Feaver |
| 2003/0117446 A1 | 6/2003 | Esposito-Ross et al. |
| 2003/0126047 A1 | 7/2003 | Hollar et al. |
| 2003/0135425 A1 | 7/2003 | Leavitt |
| 2003/0135435 A1 | 7/2003 | Aharoni |
| 2003/0139985 A1* | 7/2003 | Hollar et al. .................... 705/30 |
| 2003/0144901 A1 | 7/2003 | Coulter et al. |
| 2003/0149674 A1 | 8/2003 | Good et al. |
| 2003/0154163 A1 | 8/2003 | Phillips et al. |
| 2003/0158811 A1 | 8/2003 | Sanders et al. |
| 2003/0163431 A1 | 8/2003 | Ginter et al. |
| 2003/0187796 A1 | 10/2003 | Swift et al. |
| 2003/0191711 A1 | 10/2003 | Jamison et al. |
| 2003/0195815 A1 | 10/2003 | Li et al. |
| 2003/0200172 A1 | 10/2003 | Randle |
| 2003/0200185 A1 | 10/2003 | Huerta et al. |
| 2003/0212617 A1 | 11/2003 | Stone et al. |
| 2003/0220863 A1 | 11/2003 | Holm et al. |
| 2003/0225883 A1 | 12/2003 | Greaves et al. |
| 2003/0233252 A1 | 12/2003 | Haskell et al. |
| 2003/0233286 A1 | 12/2003 | Hahn-Carlson et al. |
| 2003/0233292 A1 | 12/2003 | Richey et al. |
| 2003/0233321 A1 | 12/2003 | Scolini et al. |
| 2004/0010463 A1 | 1/2004 | Hahn-Carlson |
| 2004/0019562 A1 | 1/2004 | Viberg |
| 2004/0034578 A1 | 2/2004 | Oney et al. |
| 2004/0039696 A1 | 2/2004 | Harmon et al. |
| 2004/0049446 A1 | 3/2004 | Seljeseth |
| 2004/0068431 A1 | 4/2004 | Smith et al. |
| 2004/0095237 A1 | 5/2004 | Chen et al. |
| 2004/0098350 A1 | 5/2004 | Labrou et al. |
| 2004/0098663 A1 | 5/2004 | Rey et al. |
| 2004/0107123 A1 | 6/2004 | Haffner et al. |
| 2004/0107125 A1 | 6/2004 | Guheen et al. |
| 2004/0117383 A1 | 6/2004 | Lee et al. |
| 2004/0123129 A1 | 6/2004 | Ginter et al. |
| 2004/0139032 A1 | 7/2004 | Rowan |
| 2004/0153389 A1 | 8/2004 | Lortscher |
| 2004/0153403 A1 | 8/2004 | Sadre |
| 2004/0153407 A1 | 8/2004 | Clubb et al. |
| 2004/0158510 A1 | 8/2004 | Fisher |
| 2004/0172360 A1 | 9/2004 | Mabrey et al. |
| 2004/0172368 A1 | 9/2004 | Johnson et al. |
| 2004/0181468 A1 | 9/2004 | Harmon et al. |
| 2004/0184163 A1 | 9/2004 | Nishioka et al. |
| 2004/0186806 A1 | 9/2004 | Sinclair et al. |
| 2004/0187075 A1 | 9/2004 | Maxham et al. |
| 2004/0201074 A1 | 10/2004 | Khandros et al. |
| 2004/0225574 A1 | 11/2004 | Arnold et al. |
| 2004/0230536 A1 | 11/2004 | Fung et al. |
| 2004/0230601 A1 | 11/2004 | Joao et al. |
| 2004/0243690 A1 | 12/2004 | Hancock et al. |
| 2004/0254808 A1 | 12/2004 | Bennett et al. |
| 2004/0260634 A1 | 12/2004 | King et al. |
| 2005/0015332 A1 | 1/2005 | Chen |
| 2005/0021363 A1 | 1/2005 | Stimson et al. |
| 2005/0021527 A1 | 1/2005 | Zhang et al. |
| 2005/0027613 A1 | 2/2005 | Takekuma et al. |
| 2005/0027651 A1 | 2/2005 | DeVault et al. |
| 2005/0033660 A1 | 2/2005 | Solomon |
| 2005/0033760 A1 | 2/2005 | Fuller et al. |
| 2005/0055306 A1 | 3/2005 | Miller et al. |
| 2005/0075964 A1 | 4/2005 | Quinn et al. |
| 2005/0119980 A1 | 6/2005 | Kohavi et al. |
| 2005/0125260 A1 | 6/2005 | Green et al. |
| 2005/0131839 A1 | 6/2005 | Cordery et al. |
| 2005/0137947 A1 | 6/2005 | Schaub et al. |
| 2005/0149378 A1 | 7/2005 | Cyr et al. |
| 2005/0165699 A1 | 7/2005 | Hahn-Carlson |
| 2005/0177435 A1 | 8/2005 | Lidow |
| 2005/0177507 A1 | 8/2005 | Bandych et al. |
| 2005/0192896 A1 | 9/2005 | Hutchison et al. |
| 2005/0216368 A1 | 9/2005 | Wechsel |
| 2005/0234820 A1 | 10/2005 | Mackouse |
| 2005/0240592 A1 | 10/2005 | Mamou et al. |
| 2005/0246192 A1 | 11/2005 | Jauffred et al. |
| 2005/0251478 A1 | 11/2005 | Yanavi |
| 2005/0256802 A1 | 11/2005 | Ammermann et al. |
| 2005/0274792 A1* | 12/2005 | Hahn-Carlson et al. ...... 235/379 |
| 2005/0278220 A1 | 12/2005 | Hahn-Carlson et al. |
| 2005/0278221 A1* | 12/2005 | Hahn-Carlson et al. ........ 705/16 |
| 2005/0278244 A1 | 12/2005 | Yuan |
| 2005/0278251 A1 | 12/2005 | Hahn-Carlson |
| 2005/0278255 A1 | 12/2005 | Hahn-Carlson et al. |
| 2005/0283434 A1* | 12/2005 | Hahn-Carlson et al. ........ 705/39 |
| 2005/0283437 A1 | 12/2005 | McRae et al. |
| 2005/0289023 A1 | 12/2005 | Hahn-Carlson et al. |
| 2005/0289024 A1 | 12/2005 | Hahn-Carlson |
| 2006/0004670 A1 | 1/2006 | McKenney et al. |
| 2006/0010058 A1 | 1/2006 | D'Hers et al. |
| 2006/0015454 A1 | 1/2006 | Hahn-Carlson |
| 2006/0036476 A1 | 2/2006 | Klem |
| 2006/0041487 A1* | 2/2006 | Santalo et al. .................. 705/30 |
| 2006/0116957 A1 | 6/2006 | May et al. |
| 2006/0167762 A1 | 7/2006 | Hahn-Carlson |
| 2006/0167791 A1 | 7/2006 | Hahn-Carlson |
| 2006/0167792 A1 | 7/2006 | Hahn-Carlson |
| 2006/0233334 A1 | 10/2006 | Bingaman et al. |
| 2006/0287983 A1 | 12/2006 | Chauhan |
| 2007/0022021 A1 | 1/2007 | Walker et al. |
| 2007/0055582 A1 | 3/2007 | Hahn-Carlson |
| 2007/0136278 A1 | 6/2007 | Grazioli et al. |
| 2007/0156584 A1 | 7/2007 | Barnes et al. |
| 2007/0192178 A1 | 8/2007 | Fung et al. |
| 2007/0208635 A1 | 9/2007 | Van Luchene et al. |
| 2007/0214065 A1 | 9/2007 | Kahlon et al. |
| 2007/0214077 A1 | 9/2007 | Barnes et al. |
| 2007/0246528 A1 | 10/2007 | Kubo et al. |
| 2007/0262140 A1 | 11/2007 | Long |
| 2007/0271160 A1 | 11/2007 | Stone et al. |
| 2007/0282724 A1 | 12/2007 | Barnes et al. |
| 2007/0282744 A1* | 12/2007 | Barnes et al. ................... 705/40 |
| 2007/0299769 A1 | 12/2007 | Fowler et al. |
| 2008/0082374 A1 | 4/2008 | Kennis et al. |
| 2008/0086396 A1 | 4/2008 | Hahn-Carlson |
| 2008/0103972 A1 | 5/2008 | Lanc |
| 2008/0172314 A1 | 7/2008 | Hahn-Carlson |
| 2008/0215456 A1 | 9/2008 | West et al. |
| 2008/0249940 A1 | 10/2008 | Hahn-Carlson et al. |
| 2008/0281752 A1* | 11/2008 | Chien ............................. 705/38 |
| 2009/0171727 A1 | 7/2009 | Hahn-Carlson |
| 2009/0259576 A1 | 10/2009 | Hahn-Carlson |
| 2009/0265274 A1 | 10/2009 | Hahn-Carlson et al. |
| 2009/0287590 A1 | 11/2009 | Hahn-Carlson |
| 2009/0287598 A1 | 11/2009 | Hahn-Carlson |
| 2009/0292630 A1 | 11/2009 | Hahn-Carlson et al. |
| 2009/0307114 A1 | 12/2009 | Hahn-Carlson |
| 2010/0017315 A1 | 1/2010 | Hahn-Carlson |
| 2010/0049650 A1 | 2/2010 | Keaton et al. |
| 2010/0070397 A1 | 3/2010 | Hahn-Carlson et al. |
| 2010/0138325 A1 | 6/2010 | Hahn-Carlson |
| 2010/0185540 A1 | 7/2010 | Hahn-Carlson et al. |
| 2010/0205054 A1 | 8/2010 | Hahn-Carlson et al. |
| 2011/0004544 A1 | 1/2011 | Baum |
| 2011/0029404 A1 | 2/2011 | Hahn-Carlson et al. |
| 2012/0158558 A1 | 6/2012 | Hahn-Carlson et al. |

(56) References Cited

U.S. PATENT DOCUMENTS

FOREIGN PATENT DOCUMENTS

| | | | |
|---|---|---|---|
| EP | 0425421 A2 | 5/1991 | |
| EP | 0779587 A2 | 6/1997 | |
| EP | 1659526 A2 | 5/2006 | |
| FR | 2543327 A1 | 9/1984 | |
| GB | 2398894 | 9/2004 | |
| JP | 2001312680 A | 11/2001 | |
| WO | WO 97/07468 A1 | 2/1997 | |
| WO | WO 99/08218 A1 | 2/1999 | |
| WO | WO 00/62225 A1 | 10/2000 | |
| WO | WO 01/09782 A2 | 2/2001 | |
| WO | WO 01/35570 A1 | 5/2001 | |
| WO | WO 01/48659 A1 | 7/2001 | |
| WO | WO 0182193 | 11/2001 | |
| WO | WO 0188813 | 11/2001 | |
| WO | WO 01/26017 A2 | 12/2001 | |
| WO | WO 02/21405 A1 | 3/2002 | |
| WO | WO 02/006920 A2 | 9/2002 | |
| WO | WO03034178 * | 4/2003 | G06Q 40/00 |
| WO | WO03034178 A2 * | 4/2003 | G06Q 40/00 |
| WO | WO 2005/124635 A2 | 12/2005 | |
| WO | WO 2006/071881 A2 | 7/2006 | |
| WO | WO2006071881 * | 7/2006 | G06Q 40/00 |
| WO | WO 2008/045793 A1 | 4/2008 | |
| WO | WO2008045793 * | 4/2008 | H04K 1/00 |

OTHER PUBLICATIONS

Spencer et al., "JIT Systems and external logistices suppliers," International Journal of Operations & Production Management, v14, n6, pp. 60-74, 1994.
White, How Computers Work, Sep. 1999, 93 pp.
Professional Builder (1993) www.highbeam.com, Contracts & Law: Part III 8 pp.
South China Morning Post, Hong Kong, Buying "Products over the Net," Jul. 2000, 2 pp.
Xcitek Press Release, "U.S. Bank Selects Xcitek for Corporate Actions Data and XSP for Corporate Actions Automation," NY, NY, Dec. 2003, 1 pp.
Berhad, "Fueling financial oil for the economy," The New Straits Times Press (Malaysia), Dec. 10, 2001, 3 pp.
Singh, "A new road to recovery," Risk, pp. 108-110, Sep. 2004.
"Credit Derivatives and Mortgage-backed Bonds in Capital Adequacy Requirements for Market Risk," http://www.rahoitustarkastus.fi/Eng/Regulation/FSA_standards/FSA_interpretations/4_2005.html, Apr. 2005, 5 pp.
Brochure: SAP Supplier Relationship Management—At a Glance, SAP, 2003, 16 pp.
Brochure: Self-Service Procurement: Slashing Costs and Saving Time, SAP, 2003, 12 pp.
Electronic Commerce News, "Sarbanes-Oxley Continue to be Key Issue in Corporate Payments Space," Sep. 1, 2003, v8, issue 18, 7 pp.
Denver Business Wire, "JD Edwards Continues to drive network-centric applications delivery with OneWorld enhancements," Jun. 16, 1997, p. 06160089.
Notice from the European Patent Office concerning business methods, dated Oct. 1, 2007, 2 pp.
Egan, "Administrative Orders from the Office of the Governer of Alaska," Jul. 18, 1972, 3 pp. http://www.gov.state.ak.us/admin-orders/018.html.
Bodnar, "Estimating Exchange Rate Exposure: Issues in Model Structure," Financial Management v32, n1, pp. 35-67, 2003.
Plewka, "Germany seizes the Emu initiative," International Tax Review, v8, n5, pp. 43-46, May 1997.
Huang, "Exchange Risk and Exchange Rate Pass-Through," v67/02-A of Dissertation Abstracts International, 2005.
McKeefry, "Seeking microcontrollers desperately," Electronic Buyers News, n972, Sep. 11, 1995, 6 pp.
Mallory, Great Plains Accounting v.7 (Great Plains Software's accounting software) (Product Accouncement), Apr. 22, 1993, 3 pp.
Russell, "Kitting out is now in (Use of component kits is expanding as distributors develop added-value activities)," Electronic Times (online), n 852, Apr. 17, 1997, 4 pp.
Notification of Transmittal of the International Search Report and the Written Opinion of the International Searching Authority, or the Declaration dated Jan. 23, 2009 in corresponding PCT Application No. PCT/US09/31784, 9 pgs.
Notification of Transmittal of Copy of International Preliminary Report on Patentability dated Aug. 5, 2010 in corresponding PCT Application No. PCT/US09/31784, 6 pgs.
Extended European Search Report mailed May 4, 2012 in corresponding EP Application No. 09703477.1, 4 pgs.
EP Communication dated May 22, 2012 in corresponding EP Application No. 09703477.1, 1 pg.
Response filed Dec. 3, 2012 to the EP Communication dated May 22, 2012 in corresponding EP Application No. 09703477.1, 14 pgs.
Fletcher, "Limits on reinsurance offsets sought by California regulator," Business Insurance, May 8, 1995 4 pp.
Response filed Oct. 25, 2010 to Communication pursuant to Rules 161(2) and 162 EPC in corresponding EP Application No. 09703477.1, 14 pgs.

\* cited by examiner

INVENTORY-BASED PAYMENT PROCESSING SYSTEM AND APPROACH

FIELD OF THE INVENTION

The present invention is directed to transaction processing and, more specifically, to an auditing and processing system that automatically processes payable aspects of inventory-based transactions involving buyers and service providers.

BACKGROUND

Operational management of contractual and transactional interactions between buyers of utility-type services and others involved in the exchange of products for purposes of commerce have typically been labor and time intensive. Generally, the processes of managing transactions between business entities have been unduly burdensome and inefficient.

For many organizations, managing and tracking accounts payable business functions can be particularly burdensome and costly. When a particular organization contracts and otherwise does business with a large number of suppliers/service providers, the organization typically must interact with each supplier/service provider on an individual basis. As the diversity of these interactions increases, the burden and cost associated with managing and tracking accounts payable business functions is exacerbated.

Individual interactions between buyers and service providers are often characterized by specific contracts, payment rules and other financial processing characteristics. For example, certain service providers may require payment terms such as a net payment due within a particular time period, payment to a particular financial institution or payment in a particular currency. In addition, certain service providers may require different payment terms for different contracts. Entity-specific and transaction-specific variances in payment terms can be particularly difficult to manage and track.

For various transactions, the process of determining whether a seller or supplier's request for payment is valid and accurate is made even more complex when the payment request (e.g., invoice) contains recurrent billings associated with specifically-identifiable items associated with the buyer. For instance, utilities such as communication utilities (e.g., a communication circuit) are often billed on a cyclic basis. When bills are carried over and/or payment is delayed, tracking these bills and their payment becomes difficult.

In addition, when a transaction reaches the payment step, financial institutions for different parties to the transaction must interact with each other. This interaction typically involves complex agreements and associations that facilitate the transfer of funds. At times, there can be delays in payment or disputes regarding terms of payment. In addition, this process is highly susceptible to error. Interaction complexity, delay and error, as well as a multitude of other characteristics of transaction payment can cost one or more parties to a transaction (including financial institutions) a significant amount of funds.

Most industries are quite competitive and any cost savings are therefore important. Administrative costs are targeted for reduction as no revenue is directly generated from administrative functions. However, administrative costs associated with commercial transactions have been difficult to reduce in the current business environment with widely diffused data.

The above and other difficulties in the management and coordination of business transactions have presented administrative and cost challenges to business entities involved in various aspects of transactions, including accounts payable aspects and others.

SUMMARY

The present invention is directed to overcoming the above-mentioned challenges and others related to the types of devices and applications discussed above and in other applications. The present invention is exemplified in a number of implementations and applications, some of which are summarized below.

According to an example embodiment of the present invention, an automated payment processing system processes payment for transactions involving a supplier and a buyer, the supplier providing merchant offerings (e.g., goods and/or services) to the buyer for one or more of the buyer's inventory items. The buyer provides information including contract terms, pricing and auditing rules for transactions involving the buyer and selected sellers. An auditing processor audits invoices or transactions (with related payments) on behalf of each buyer using that buyer's provided auditing rules, and facilitates payment to one or more selected service providers involved in the particular transaction being audited (e.g., when the audit indicates payment is appropriate). The payment (e.g., and related invoice) is associated with an appropriate inventory item, or group of inventory items, as defined by the particular buyer for which payment is made.

In connection with other example embodiments of the present invention, maintenance service-based transactions are processed via an automated transaction management system. According to one such embodiment, such a transaction management approach involves the processing of financial aspects of a transaction using transaction rules associated with a buyer for auditing the transaction and any associated invoices. A processor arrangement process transactions for merchant offerings subject to a related set of inventory data by auditing the transactions relative to inventory data corresponding to an inventory to which the transaction applies and stored contract data for the transaction, by processing payment in response thereto, and by assessing a processing fee against one or more parties to the transaction.

Other aspects of the present invention are directed to corresponding elements (alone and in various combination) of such transaction arrangements/systems and methods and functionality thereof.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of transaction processing and management approaches, and has been found to be particularly useful for applications involving the processing of payment, such as for accounts payables, on behalf of a buyer for a transaction. While the present invention is not necessarily limited to such approaches, various aspects of the invention may be appreciated through a discussion of various examples using these and other contexts.

According to an example embodiment of the present invention, a transaction processing system includes an auditor engine that interacts with financial institutions and one or more transaction parties for auditing transactions and processing payment functions on behalf of a buyer entity that receives merchant offerings (e.g., services and/or goods) from a provider. The auditor engine responds to provider invoices by automatically auditing some or all of each invoice (and payment therefore) in accordance with business rules specifying rules for the transaction and, where appropriate, user profile information specific to one or more transaction parties. When the audit is successful, the auditor engine facilitates the authorization of payment either directly or by providing information indicating a successful audit (for some or all of an invoice), where such provided information is subsequently used to process payment.

In the exemplifying embodiments presented herein, the auditor engine can be further adapted to use the stored profile information for the buyer to match each transaction (or each payment for some or all of a transaction) with an inventory of items associated with the buyer, where this "inventory" refers to an itemized catalog or list of tangible goods or property, or the intangible attributes or qualities. For example, this approach is useful for ensuring that funds are associated with an appropriate inventory-type item. Matching transactions in this manner involves, where appropriate, the matching of different aspects or line items corresponding to a particular transaction with an inventory item. Inventory items may include, for example, particular equipment associated with (e.g., owned or operated by) the buyer, a particular accounting classification, a particular manufacturing or business location of the buyer, or other item corresponding to an inventory of items that are the subject of transactions for the buyer. In this regard, an inventory may include several inventory items, in one or more tiers relating to a particular buyer and/or item relating to that buyer (e.g., a particular piece of equipment may belong to an inventory for a business location that belongs to an inventory of business locations for a particular buyer entity).

In some applications, the auditor engine carries out matching functions prior to auditing a transaction (an invoice and its payment), where the audit considers information corresponding to the match. For example, a particular buyer billed for an invoice may maintain different payment approaches for different equipment or for different goods or services that are the subject of an invoice. In this regard, the auditor engine uses the matching to identify appropriate auditing approaches to use for auditing invoices.

In some applications, the auditing engine utilizes an inventory of prior invoices and/or payments for a particular item, and audits a current invoice against an inventory history. One such example involves a buyer that contracts with a maintenance service provider to schedule repetitive maintenance upon equipment or a group of equipment (grouped in one or more of a variety of manners), for facilities (e.g., lawn care) or for other items requiring maintenance. When an invoice is received for an instance of scheduled maintenance, the auditing engine accesses the preexisting inventory history and compares the invoice with information in the inventory history. The comparison may involve, for example, ensuring the previously-invoiced (and/or paid) maintenance service is not erroneously paid more than once, or ensuring that a payment amount or a billing rate in a current invoice is commensurate with previous payment amounts or billing rates. In this regard, inventory history can be used to audit against overpayment (or underpayment, in a similar manner), variations in assessed fees or other characteristics as may be specified by a particular buyer and characterized in its business rules or user profile.

In connection with some embodiments, the auditor engine audits transactions using buyer input together with stored contract information pertaining to the transaction being audited. For example, when a buyer determines that a particular contract (e.g., an invoice for the contract) has payable aspects, the buyer can send a payment authorization to the auditor engine. The buyer may send a notice indicating that a payable condition has been met, such as by indicating that a service or good is acceptable. This payable condition may apply, for example, to an entire invoice or to a portion of an invoice such as a line item that relates the particular service or good determined to be acceptable (e.g., where a partial performance is deemed acceptable). The auditor engine matches the payment authorization to a particular contract involving the buyer and uses the received payable condition together with other information to determine whether a payment can and/or should be made. If payment can be made, the auditor engine automatically processes payment on behalf of the buyer using the contract terms with the payment authorization.

When a transaction is successfully audited (e.g., approved for payment), the auditor engine interacts with a financial institution for the buyer for tendering payment to one or more providers (e.g., service or goods providers) on behalf of the buyer and, where appropriate, indicating what the payment is for. In some applications, these service providers offer services such as utility services generally related to energy, water or utilities. In other applications, these service providers offer maintenance-type services, such as for machines, vehicles or other items requiring or benefiting from maintenance services.

Fees are assessed for processed transactions in one or more of a variety of manners. In some applications, the fees are assessed to service providers for the tendering of payment thereto. In other instances, fees are assessed to buyers for the transactions processed on behalf thereof. With these examples, any transaction party can be assessed fees on a selective basis, with examples of such parties including buyers or service providers as discussed above. In some embodiments, when credit is extended for payment on behalf of a buyer, a financial institution underwriting the buyer's payment (e.g., sponsoring the buyer's payment) underwrites the extension of credit, a fee is assessed for the underwriting and extension of credit. Where fees are assessed for external financial institutions, a part of that fee may be retained as part of a processing fee, with another part of the fee passed to the financial institution. In this regard, buyer and/or provider participation in the automatic processing of the transaction is associated with a fee that is used to cover transaction processing and, where appropriate, credit extension and underwriting functions, with the processing generally affording each provider a corresponding cost savings in otherwise facilitating the transaction.

In connection with another example embodiment of the present invention, the transaction processor is programmed to monitor processed transactions for a particular buyer or group of related buyers to characterize trends or other aspects of the transactions and using those characterizations to group or otherwise associate buyer items into inventory categories. For example, recurring transactions for a particular type of service such as that commonly associated with a maintenance transaction may be grouped into an inventory of recurring maintenance transactions. Such grouping may be effected, for example, by the transaction processor upon recognition that a particular invoice line item recurs at a particular interval.

As a specific instance of a self-learning approach corresponding to one or more example embodiments, transactions are processed for a buyer that owns three pieces of equipment that all receive the same maintenance on a routine basis. Upon monitoring payment for transactions involving the routine maintenance, the transaction processor identifies the recurrence and selectively groups those three pieces of machinery into a common inventory. In applications where the inventory grouping is desirably more specific, the transaction processor further groups only the routine maintenance portion of invoices for the three pieces of machinery into a common inventory, and separately directs or processes other invoices, such as those for non-routine maintenance or other items corresponding to the equipment. In this regard, the inventory may be attributed to a financial inventory, with groupings based upon financial categories.

In some applications, payment made on behalf of buyers is underwritten by a financial institution and/or an operator of the transaction processing system. In some instances, the underwriting is effected to provide an assurance that the buyer will make a timely payment (e.g., for financing accounts receivable for a seller or sellers). In other instances, the underwriting is effected for an actual extension of credit funds on behalf of the underwritten buyer, for payment to a service provider (e.g., for financing accounts payable for a buyer). Fees are also assessed, where appropriate, to the one or more service providers for underwriting the payment by a financial institution. In this regard, the underwriting may be effectively assessed against one or more transaction parties, for example where a service provider agrees to underwrite its participant buyer's participation in the transaction processing system.

In one implementation, the auditor engine is adapted to respond to an authorization received from a buyer by authorizing payment for a transaction to which the authorization applies. When service providers (e.g., as defined in profile information for a particular buyer) send an invoice to the auditor engine, the buyer associated with the invoice is contacted and allowed to review the invoice. This review may be carried out, for example, using an electronic communications link facilitating the buyer's access to information on the invoice. The buyer can then review electronically and, if appropriate, authorize payment for some or all of any amount indicated on the invoice. The auditor engine responds to payment authorization from the buyer by automatically facilitating payment for the invoice in accordance with stored profile information for the service provider providing the invoice.

In various example embodiments and applications herein, the term buyer may be used to generally refer to one or more of a variety of entities or individuals. For example, in some applications, a buyer may be a business entity such as a corporation that purchases services or goods from a supplier. In other applications, a buyer may be more than one entity, such as a subsidiary and a parent company where the subsidiary receives goods and/or services and the parent company is involved in the transaction for the goods and/or services in one or more of a variety of manners. Other applications are directed to buyers that are group purchasing organizations, where members of the group purchasing organizations receive purchased goods or services (and also may be buyers in this context). Financial institutions for one or more parties to the transaction are also buyers in certain aspects. For transactions involving multiple selling parties including an intermediate seller that sells goods and/or services to a buyer, where the goods and or services are provided, at least in part, by a performing seller, the intermediate seller is also a buyer relative to the performing seller.

Figure 1:
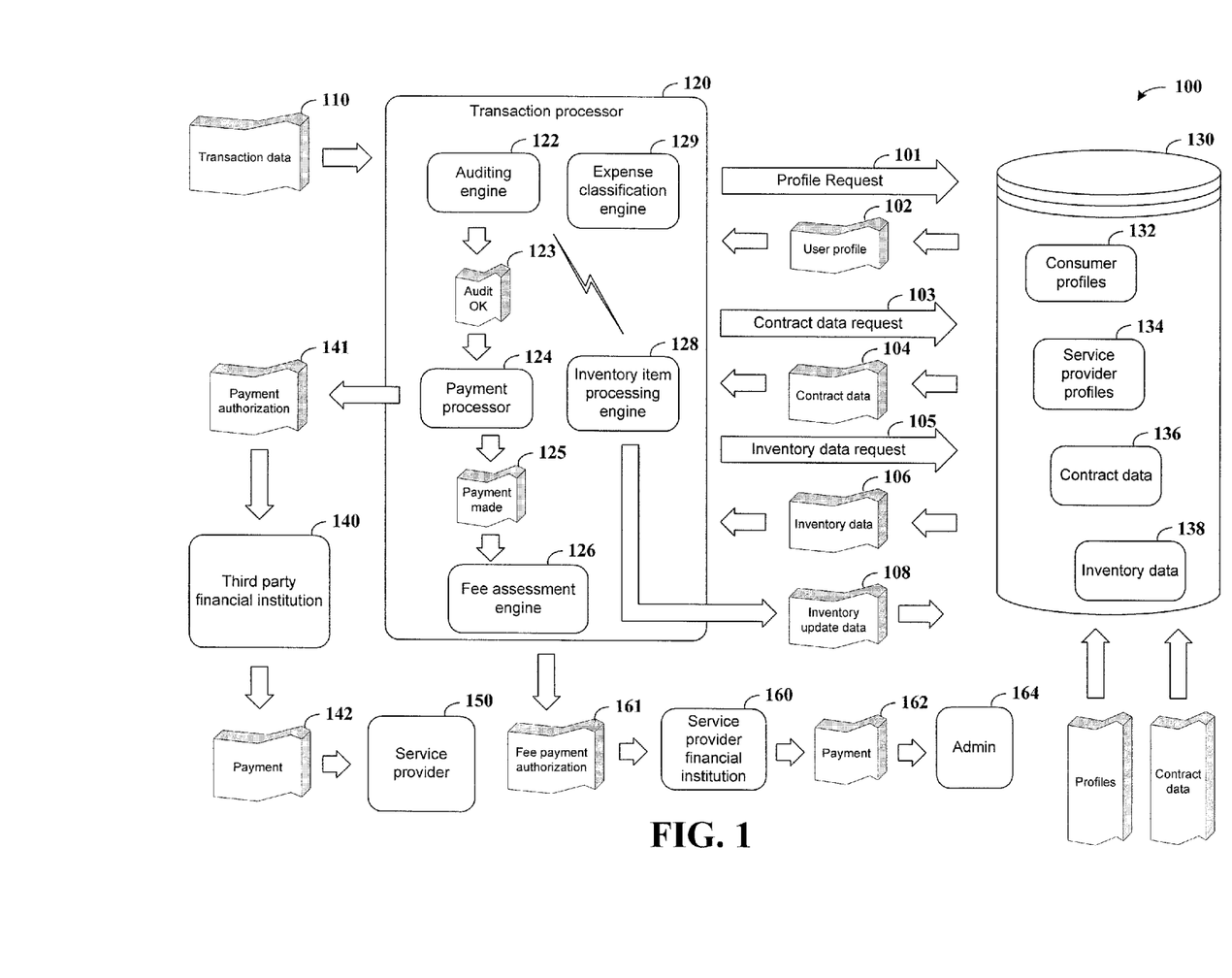
FIG. 1 shows an arrangement and approach for transaction management, according to an example embodiment of the present invention.

FIG. 1 shows an arrangement and approach 100 for utility or maintenance-type transaction management with identifiable buyer-based recipient target inventories, according to another example embodiment of the present invention. FIG. 1 is shown an described with approaches to transaction processing involving service providers, such as those providing primarily services such as maintenance or utility providers. However, the approaches shown in FIG. 1 are applicable to the provision of goods, either by the service providers or by different providers (sellers). For instance, a maintenance contractor operating as a service provider may provide both services and goods (e.g., labor and parts/supplies) for transactions. Similarly, a utility service provider that provides energy (e.g., electricity or natural gas) can be construed as providing a good (the energy) along with a service (a portion of each invoice corresponding to the delivery of the energy). In this regard, it is appreciated that the following description using "service providers" is applicable to providers of goods as well, in connection with or independent from the provision of services.

A transaction processor 120 uses data in a database arrangement 130 to process payment for transactions involving buyers and service providers, interacting with financial institutions to effect the payment and using an inventory item processing engine 128 to facilitate the processing of inventory data for sellers and/or buyers participating in transactions. An administrator 164 of the arrangement and approach 100 assesses a fee for processing transactions and/or for other aspects of transactions such as financing aspects, where the fee may include a fee for a financial institution or other transaction participant. While shown as single arrangements, both the transaction processor arrangement 120 and database arrangement 130 are selectively implemented with multiple arrangements in local and/or disparate locations.

When transaction data 110 such as an invoice is received at the transaction processor arrangement 120, a profile request 101 is made to retrieve user profile data 102 from the database arrangement 130. The user profile data 102 includes one or more of buyer profiles 132 and service provider profiles 134 for a buyer or service provider corresponding to the transaction data 110. An auditing engine 122 also makes a contract data request 103 for a portion of the contract data 136 pertaining to the transaction data 110, and the database arrangement 130 returns contract data 104 in response to the request.

Generally, the contract data is specific to a defined relationship between a buyer and seller or service provider, where the relationship includes at least the information to which the contract pertains. For example, a particular business relationship between a buyer and seller may involve a single contract, and/or a standing relationship that relates to one or more transaction aspects such as performance, payment and contract terms. In this regard, one or both of contract data and profile information may define a relationship or relationships between buyers and sellers, and is used accordingly in processing transactions.

Where inventory data 138 is available or desirable for a particular contract returned with the contract data 136 (e.g., for an item or items in the contract corresponding to the transaction data 110), an inventory data request 105 is also made by the inventory item processing engine 128. The database arrangement 130 responds by returning inventory data 106 characterizing items pertaining to the contract that are also subject to an inventory. If inventory data is not available for an item or item to which the transaction data 110 applies, no such information is returned and the transaction processor proceeds with processing the transaction as a non-inventory-based transaction. As discussed further below, any updates or other changes to inventory at the transaction processor arrangement 120 are later returned as inventory update data 108 to the database arrangement 130, such as where data pertaining to an existing inventory is modified or updated relative to a payment event. Inventory update data 108 received at the database arrangement 130 is stored with the inventory data 138.

In some applications, when inventory data is not available for an item or item to which the transaction data 110 applies, the item is selectively added to the inventory data 138. For example, when a new item is listed in a contract or other transaction document in connection with other items currently assigned to a particular inventory, the new item can be added to that inventory automatically and/or in response to user input (e.g., by prompting the user to add the item to the inventory). In some applications where a new inventory item is not related to an existing inventory, a new inventory is established for the new item and the new item is added to the new inventory.

In some instances, the inventory update data 108 is sent to a transaction party for which the inventory update data is kept. For instance, where a buyer requests that inventory-related payment information be sent directly to its accounting department or, where automated, to the buyer's automated accounting system, the inventory update data is sent accordingly (e.g., via a network or other communications link).

In other instances, the transaction processor 120 controls user access to the inventory update data 108 as stored with the inventory data 138 at the database arrangement 130. For instance, relative to the example in the preceding paragraph, a buyer can access the inventory data 138 by communicating via the transaction processor 120, without necessarily relying upon a direct transfer of the inventory update data 108.

In some applications, an expense classification engine 129 classifies payments made for inventory items and generates expense data (e.g., as part of inventory update data 108) for updating the inventory data 138 in relation to expense classifications assigned to particular inventory items. For example, where a particular payment is for a utility expense, the expense can be classified as such in the inventory data 138 (i.e., all utilities remain as such). This approach is useful, for example, where different types of payments apply to a particular inventory item, such as a facility that has expenditures for utility expenses, service contracts and new equipment purchases. For general information regarding transaction processing and for specific information regarding approaches to expense classification that are carried out in connection with various example embodiments of the present invention, reference may be made to U.S. patent application Ser. No. 11/121,158, entitled "Transaction Accounting Processing System and Approach" and filed on May 3, 2005, which is fully incorporated herein by reference.

The auditing engine 122 uses the user profile data 102, contract data 104 and, where appropriate, inventory data 106 to audit the transaction data 110 and/or other portions of the transaction to which the transaction data applies. The auditing involves one or more of a variety of approaches. For example, the inventory data 106 is used (where applicable) to ensure that information in the transaction data 110 is correct or otherwise acceptable. The auditing may also involve using transaction aspects relating to one or more of shipping, payment, buyer approval, business rules for a buyer or seller participating in the transaction, and contract data. Auditing parameters may, for example, be set by business rules for the buyer or other entity for which the audit is being conducted. Other auditing examples are discussed further below, after discussion of payment aspects processed via the transaction processor 120.

In some applications, the auditing engine 122 audits transactions in response to user input for approving payment for transactions (e.g., buyer approval of invoices). In this context, certain embodiments are directed to providing a user interface to a buyer, such as by providing a hosted Internet web page or other communicative environment that can be accessed by a buyer for approving a transaction. The interface is used to provide the buyer with information pertaining to a particular inventory and/or inventory item, together with information upon which a decision to approve payment can be made, such as information specifying contract data or contract performance data. Generally, the transaction processor 120 provides this interface, with user inputs provided directly or indirectly for use by the auditing engine 122, which in turn audits transactions using the information and any other relevant information specified in profiles or contract data to carry out the audit.

If the auditing engine 122 is successful (positive) in its audit, positive audit data 123 is sent to a payment processor 124. The payment processor 124 uses the positive audit data 123 to generate a payment authorization 141 that is sent to a third party financial institution 140, which in turn makes a payment 142 to a service provider 150 involved in the transaction. In some applications, the third party financial institution 140 is the buyer's financial institution and accordingly collects settlement for the payment from the buyer; information specifying such a financial institution may be stored, for example, in the buyer's profile with the buyer profiles 132. In other applications, the third party financial institution 140 is associated with the transaction processor arrangement 120 (and the administrator 164), such that the transaction processor arrangement and/or the third party financial institution 140 subsequently settles with the buyer for the payment 142 made on behalf thereof.

When payment is authorized, the payment processor 124 also sends payment data 125 to a fee assessment engine 126, the payment data indicating that the payment has been authorized. In some applications, the fee assessment engine 126 responds to the payment data 125 by sending fee data to the database arrangement 130 for storage on behalf of the service provider 150. When payment for assessed fees is to be made, the fee assessment engine 126 makes a fee account balance request to the database arrangement 130, which returns fee account balance data to the fee assessment engine. The inventory item processing engine 128 uses payment data to automatically update inventory data relative, for example, to payment histories associated with inventory items on one or both of a buyer-side or seller-side accounting structures.

In another example embodiment, the inventory item processing engine 128 is programmed with self-learning functions to automatically categorize payments into inventory item categories (e.g., with a particular inventory item). A self learning process is implemented to establish a new inventory characterizing transaction items as described, for instance, in the above example embodiments. For instance, where a particular service is billed to a particular machine or other piece of equipment on a regular basis (e.g., monthly), the inventory item processing engine 128 recognizes the trend and associates the particular machine or equipment with an inventory item. Similarly, when a transaction that is being audited identifies inventory items not currently known and/or tracked, those inventory items can be added to a related list or group of inventory (e.g., upon approval by the buyer).

In another example embodiment, the inventory item processing engine 128 processes information in accordance with a tiered inventory approach, where inventory items are grouped in larger inventory groups having two or more inventory items. For instance, different site-specific equipment or locations (e.g., buildings) may be separately identified as individual inventory items. The inventory item processing engine 128 groups these individual inventory items together in an inventory group associated with the site. In this regard, the inventory item processing engine 128 provides inventory update data 108 in accordance with both an inventory item and an inventory group for that item.

In some applications, the fee assessment engine 126 uses a portion of the inventory data 138 when assessing fees, for example, by grouping together fees for a particular inventory item and assessing all fees for that item over a given time period (e.g., a month), or by grouping together fees for an inventory item type. Using the fee account balance data, the fee assessment engine 126 generates a fee payment authorization 161 for a particular service provider and sends that authorization to the service provider's financial institution 160, which generates and sends a payment 162 for the assessed fees to the administrator 164.

In certain embodiments, the fee assignment engine 126 assess fees to each payment as the payment is authorized, with the authorization contingent upon the fee assessment. Once appropriate fees are assessed, the fee assessment engine returns fee data directly to the payment processor 124, prior to the payment authorization 141 being made. The payment processor responds by reducing the amount of payment in the payment authorization 141 by the amount of fee specified in the fee data. In this regard, the service provider is paid what it is owed for a particular transaction, less a transaction fee. Where credit is extended by the administrator 164 on behalf of the buyer, the transaction processor collects funds in the amount of the fee from the buyer upon settlement. Where the buyer pays directly via the third party financial institution 140, the payment authorization 141 includes the reduced payment amount to be made to the service provider 150 as well as a fee payment amount to be made to the administrator 164 (i.e., such that the payment authorization 141 and fee payment authorization 161 are effectively processed and paid for by a common financial institution).

In various applications, fees are also assessed in accordance with inventory processing performed on behalf of one or more transaction parties. For example, where a particular buyer or seller wishes to track payments by an inventory item, that buyer or seller elects to participate in the inventory service. This election information is stored in the database arrangement 130 with respective buyer or service provider profiles 132 and 134 as appropriate. When payments are tracked, processed or otherwise managed in accordance with inventory-based elections by the inventory item processing engine 128, the payment processor 124 assesses a fee that includes any fees in accordance with such tracking.

In connection with another example embodiment, recurring fixed-payment transactions are processed for contracts having contract data 136 specifying the fixed payment. For these transactions, the transaction processor 120 may initiate an audit and payment processing sequence independent from the receipt of any new transaction data, and base the processing upon the known recurring transaction. For example, where a service provider contracts with a buyer to provide a particular service for a certain period at a fixed rate, the transaction processor 120 uses contract data pertaining to this contract to automatically initiate transaction processing for the recurring transaction at a particular interval as specified in the contract.

Other example embodiments are directed to invoice-free transaction processing, where the transaction processor 120 initiates a transaction processing sequence in response to a predefined event, such as the receipt of goods, the performance of services or, in the event of a recurring transaction as discussed above, a particular date pertaining to the recurrence. For example, a transaction processing sequence may be initiated by automatically generating an invoice, or otherwise processing transaction data to facilitate a payment in a manner similar to that which would be processed in response to an invoice. In these embodiments, the payment processor 124 generates a payment authorization 141 for transactions initiated internally. In some applications, no audit is carried out (or the audit is simply that the predefined event occurs). In other applications, the auditing engine 122 audits aspects of the invoice-free transaction, such as by determining that other conditions are met for the initiated transaction processing sequence before payment can be made.

Figure 2:
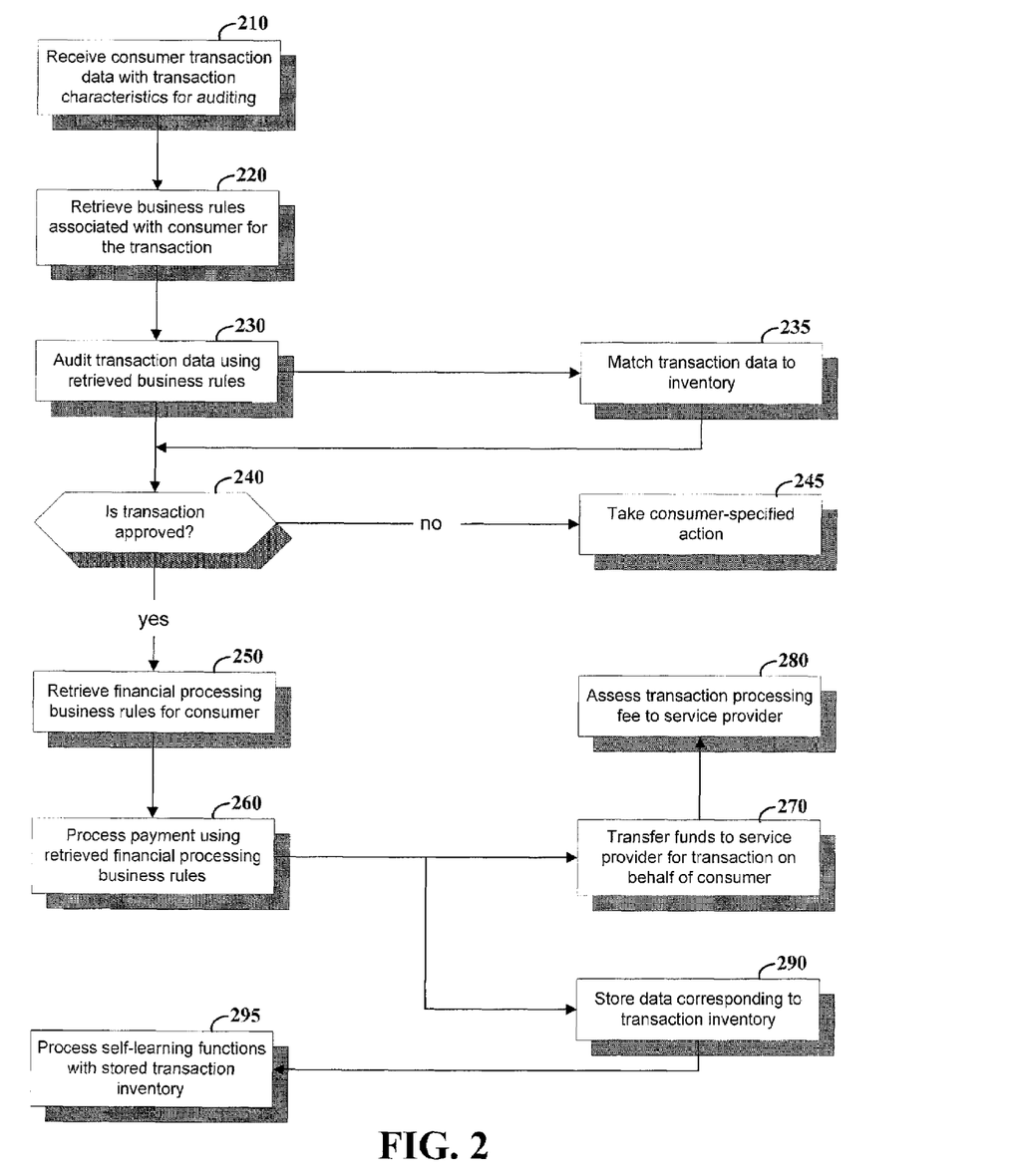
FIG. 2 shows a flow diagram for transaction processing, according to another example embodiment of the present invention.

FIG. 2 shows a flow diagram for inventory-based transaction processing with an audit approach for payment, according to another example embodiment of the present invention. The inventory-based transaction processing approach shown in FIG. 2 can be implemented, for example, using the system and approach shown in FIG. 1 and the various embodiments discussed in connection therewith.

At block 210, buyer transaction data including auditable characteristics is received for use in processing invoices relating to the transaction data. This transaction data may include, for example, one or more of an invoice itself, a receipt of goods, a buyer approval to initiate payment, or other information pertaining to payment for the transaction. Business rules associated with the buyer to which the transaction data pertains are retrieved at block 220. These rules may include, for example, rules specific to a particular contract or contracts to which the transaction data applies, as well as general rules specific to the buyer.

At block 230, the transaction data is audited using the retrieved business rules. In some applications, the business rules specify that the auditing should involve the presentment of invoice information for approval by the buyer, or that the auditing be automatically performed using characteristics in the business rules for assessing invoices as relative to the received transaction data. In this regard, the transaction data may simply indicate that, for purposes of approval, any invoice is to be submitted directly to the buyer for approval (in this instance, the audit at block 230 may simply be to acknowledge than an invoice can be received).

In some applications, the transaction data is matched to a particular inventory at block 235. This matching involves, for example, approaches similar to those discussed above, independently from the figures and/or in connection with FIG. 1. Once matched, characteristics of the respective inventory can selectively be used for auditing and/or tracking approaches as discussed further below. Furthermore, certain applications involve the matching of transaction data at block 235 after other steps, such as those shown in blocks 240-280.

If the transaction is not approved at block 240, via the audit at block 230, an action specified by the buyer in its business rules is taken at block 245 and the transaction processing stops.

If the transaction is approved at block 240, the process moves forward to block 250 where financial processing business rules for the buyer are retrieved. Payment is processed at block 260 using the financial processing business rules, with funds corresponding to the payment transferred, on behalf of the buyer, to a service provider (or service providers) to which the payment is owed at block 270. This funds transfer may involve, for example, the extension of credit on behalf of the buyer, with underwriting performed by a financier with fees associated with the underwriting being assessed with a transaction fee. A transaction processing fee (including the underwriting fee, where appropriate) is assessed to the service provider at block 280. In some instances, the transaction processing fee is assessed to the service provider by extracting the fee from any payment processed with the funds transfer at block 270.

In some embodiments where transaction inventory data is matched with the transaction data at block 235, data corresponding to transaction inventory is stored at block 290. That is, payments made, approved audits or received invoices or receipts of goods/services can be selectively stored together with inventory data at block 290 for use in a variety of applications such as future audit approval, tracking and more.

In another example embodiment, the approach shown in FIG. 2 further includes a self-learning process at block 295. Such a step is one such application and use of the transaction inventory data stored at block 290. In the self-learning process, stored transaction inventory is used to generate historical information characterizing transactions pertaining to a particular inventory. Results are stored for use in one or more of transaction data matching and transaction auditing. These approaches may, for example, involve those discussed above.

Figure 3:
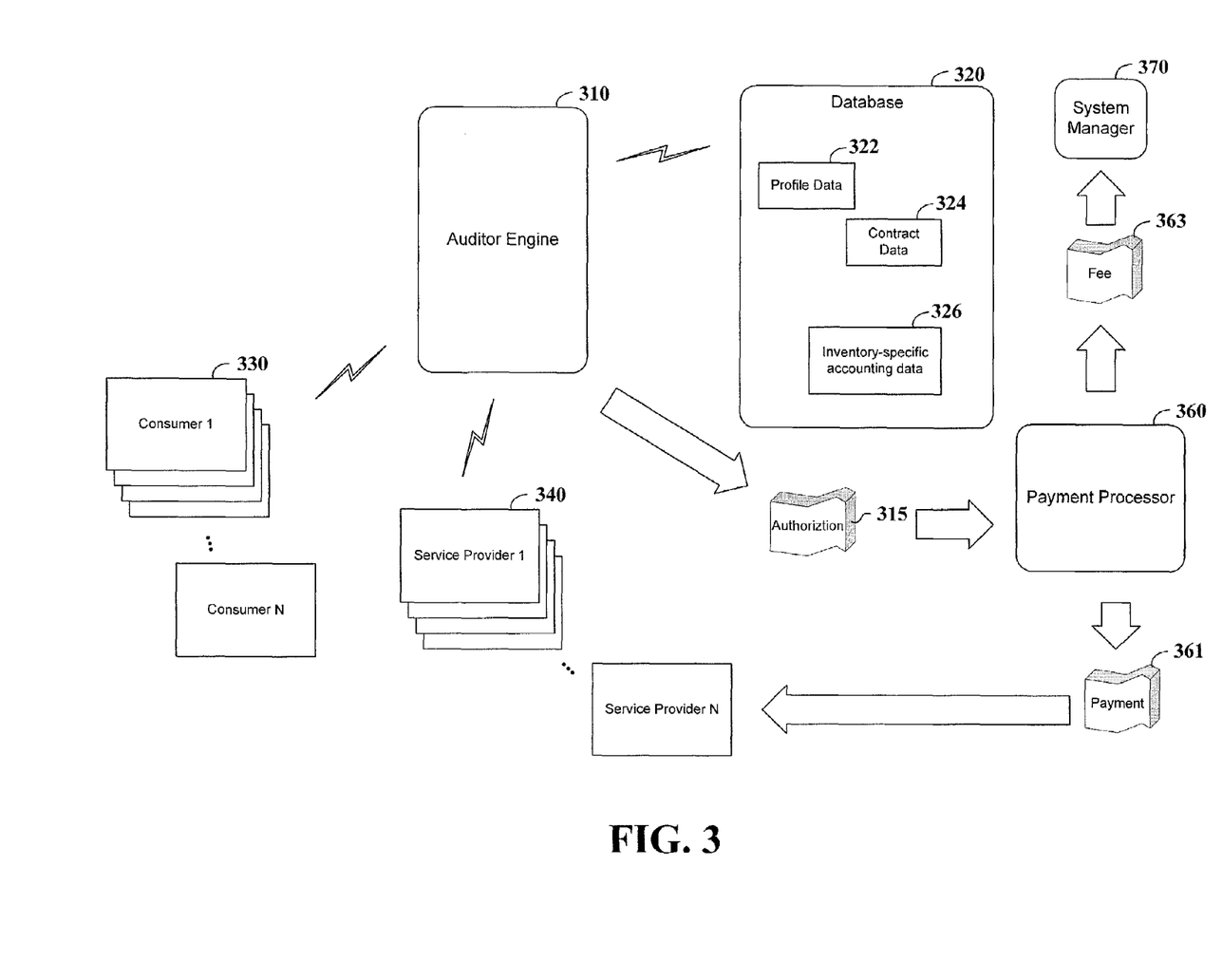
FIG. 3 shows an approach to auditing payment for utility-type transactions for buyers, according to another example embodiment of the present invention.

Turning now to FIG. 3, an inventory-based auditor engine 310 is implemented with transaction auditing and financial processing functions for processing service transactions associated with inventory items, according to another example embodiment of the present invention. The auditor engine 310 is communicatively coupled to a database 320 that stores user profile data 322 for transaction parties as well as contract data 324 for transactions involving the transaction parties and information useful for item inventory-based auditing (e.g., similar to the database arrangement 130 in FIG. 1). The database 320 also includes inventory-specific accounting data 326 that includes information characterizing various inventory items (and related accounting items) for buyers. In some instances, the auditor engine includes the database 320 and in other instances, the database 320 is remotely situated from the auditor engine and/or implemented in two or more different database structures.

A plurality of buyers 330 including buyers 1-N interface with the auditor engine 310. Each buyer provides profile information that is stored in the database 320, the profile information generally including information for controlling buyer access to data relating to the transaction (e.g., to view invoices and inventory-based data) and for processing transactions involving the buyers. The profile information may include, for example, audit rules for auditing invoices to be paid on behalf of the buyer, and financial information that can be used for paying the invoices.

The auditor engine 310 also interfaces with a plurality of service providers 340 including service providers 1-N, each service provider engaging in a contract with at least one buyer. The service providers also provide profile information that is stored in the database 320, which includes information for controlling service provider access to transaction data, and for processing transactions involving the service providers.

In some applications, the auditor engine 310 uses the contract data 324 and/or user profiles 322 to group unassigned inventory items with a previously-defined inventory. For instance, where previously unassigned inventory items are specified on an incoming invoice including other inventory items that are grouped together in connection with a stored contract, the auditor engine 310 can automatically assign the previously unassigned inventory items to the group. This approach may be useful, for example, when adding new equipment or a new facility for a particular buyer company, where services are rendered for the new equipment or facility. The inventory-specific accounting data 326 is updated to reflect the newly-assigned inventory item.

When one of the service providers 340-N communicate a payment request such as an electronic invoice to the auditor engine 310, the auditor engine audits the request for the buyer from which the service provider is requesting payment. The auditor engine 310 retrieves profiles for the buyer and/or service provider, as well as inventory-specific accounting data pertaining to the inventory item related to the payment request, and uses the retrieved information to audit the transaction to determine whether payment is appropriate. Generally, if the retrieved inventory-specific accounting data shows that payment for services upon the inventory items related to the payment request has not been made, the auditor engine 310 can authorize payment (i.e., the auditor engine ensures that payment, either in full or in part, has not already been made for a particular service).

If the audit is successful, the auditor engine 310 communicates an authorization 315 to a payment processor 360. If payment for less than a full amount in the payment request is authorized, the authorization 315 specifies the less-than-full payment. Such an approach is appropriate, for example, where a payment request includes payment for some services that have already been paid for, as well as other services that have not been paid for. With this approach, the service provider's request for payment is automatically audited to ensure that the request is appropriate for a particular inventory item and is further accurate relative to payments that may have already been made.

The payment processor 360 generates a payment 361 in response to the authorization 315, with the payment being sent to an appropriate service provider. This payment 361 may be sent directly (e.g., via electronic funds transfer) or indirectly by interacting with one or more financial institutions as specified in profiles for the buyer and service provider participating in the transaction for which payment is made.

The payment processor 360 also optionally assesses a fee and provides the assessed fee 363 to a system manager 370 that manages the auditor engine 310 for use by the buyers and service providers. As with the payment 361, the assessed fee 363 may be sent directly or indirectly, or tracked in other manners such as in connection with a user account for one or both of the buyer and service provider involved in the payment 361.

While certain aspects of the present invention have been described with reference to several particular example embodiments, those skilled in the art will recognize that many changes may be made thereto. As examples, the above aspects can be implemented as discussed herein independently, in combination, and as part of system aspects of the embodiments described in U.S. Pat. Nos. 5,910,896, 6,571,149, 6,697,702, 6,704,612 and 7,110,959, each of which is assigned to the instant assignee and is incorporated by reference in its entirety. Such changes and implementations do not depart from the spirit and scope of the present invention, aspects of which are set forth in the following claims.

What is claimed is:

1. An automated transaction processing system for processing business transactions involving buyers and providers and pertaining to an inventory of items to which merchant offerings in the transactions apply, the system comprising:
   a data storage arrangement configured and arranged to store buyer-specific profile information and contract data for each buyer, each of the respective contracts being defined as a function of one of the plurality of buyers and a predefined business relationship between the one buyer and at least one provider; and
   a transaction processor arrangement configured and arranged to process transactions involving merchant offerings subject to an inventory according to the stored contract data and profile information, the transaction processor arrangement including:
      an auditing engine configured and arranged to audit a transaction involving a buyer and at least one provider using transaction data, inventory data corresponding to an inventory to which the transaction applies, and stored contract data for the transaction,
      a payment processor configured and arranged to process a payment for the transaction on behalf of the buyer in response to the auditing function indicating that the payment is appropriate for the transaction, and
      a fee assessment engine configured and arranged to assess a transaction processing fee against at least one of the parties to the transaction for which the payment is processed.

2. The system of claim 1, wherein the auditing engine is adapted to audit the transaction as a function of an inventory associated with at least one of the buyer and at least one provider involved in the transaction.

3. The system of claim 2, wherein the auditing engine is configured and arranged to audit the transaction as a function of contract data specific to a defined relationship between the buyer and at least one service provider.

4. The system of claim 1, wherein the auditing engine is adapted to audit the transaction as a function of inventory items associated with the transaction.

5. The system of claim 4, wherein the auditing engine is configured and arranged to audit the transaction as a function of contract data specific to the buyer and the inventory items associated with the transaction.

6. The system of claim 1, wherein the auditing engine is configured and arranged to automatically associate, responsive to transaction data indicating a new inventory item for which no previously-defined inventory data is available, the new inventory item as part of an inventory, such as an itemized catalog or list of tangible goods or property, or the intangible attributes or qualities, in accordance with at least one of the stored contract data and profile information.

7. The system of claim 1, wherein the auditing engine is configured and arranged to automatically establish, responsive to transaction data indicating a new inventory item for which no previously-defined inventory data is available, a new inventory and by associating the new inventory item with the newly-established inventory in accordance with at least one of the stored contract data and profile information.

8. The system of claim 1, wherein the auditing engine is configured and arranged to audit fixed-payment transactions involving the buyer and at least one provider in response to stored contract data for the fixed-payment transactions.

9. The system of claim 1, wherein the transaction processor is configured and arranged to automatically generate an invoice for transactions in response to a predefined event and to process the generated invoice via the auditing engine and payment processor to effect payment for the invoice.

10. The system of claim 1, wherein the fee assessment engine is configured and arranged to assess the transaction processing fee for the audit and payment processing.

11. The system of claim 1, wherein the fee assessment engine is configured and arranged to assess the transaction processing fee for financing the payment for the transaction processed by the payment processor.

12. The system of claim 1, wherein:
   the payment processor is configured and arranged to process the payment by generating and sending payment approval information to a financial institution that effects the payment for the transaction, and
   the fee assessment engine is configured and arranged to assess the transaction processing fee for financing the payment for the transaction processed by the payment processor and to provide at least a portion of the assessed transaction processing fee to the financial institution.

13. The system of claim 1, wherein the transaction processor arrangement includes an expense classification engine that is configured to automatically classify payments, made for particular inventory items, into expense classes based upon profile information for the buyer.

14. The system of claim 1, wherein, the transaction requires buyer approval for the payment,
   the transaction processor is configured to provide an interface to the buyer for viewing and approving invoices pertaining to the transaction, and
   the auditing engine is configured to audit the transaction in response to buyer approval for the transaction.

15. For use in an automated transaction processing system that processes business transactions involving buyers and providers relative to an inventory of items to which merchant offerings in the transactions apply, a system comprising:
   a data storage means for storing buyer-specific profile information and contract data for each buyer, each of the respective contracts being defined as a function of one of the plurality of buyers and a predefined business relationship between the one buyer and at least one provider; and
   a transaction processing means for processing transactions involving merchant offerings subject to an inventory according to the stored contract data and profile information, the transaction processor processing means also for:
   auditing a transaction involving a buyer and at least one provider using transaction data, inventory data corresponding to an inventory to which the transaction applies, and stored contract data for the transaction,
   processing a payment for the transaction on behalf of the buyer in response to the auditing function indicating that the payment is appropriate for the transaction, and assessing a transaction processing fee against at least one of the parties to the transaction for which the payment is processed.

16. A computer-implemented method for use in an automated transaction processing system that processes business transactions involving buyers and providers relative to an inventory of items to which merchant offerings in the transactions apply, the computer-implemented method comprising:

storing, in a data storage arrangement, buyer-specific profile information and contract data for each buyer, each of the respective contracts being defined as a function of one of the plurality of buyers and a predefined business relationship between the one buyer and at least one provider; and processing, in a transaction processor, transactions involving merchant offerings subject to an inventory according to the stored contract data and profile information, auditing, in an auditing engine, a transaction involving a buyer and at least one provider using transaction data, inventory data corresponding to an inventory to which the transaction applies, and stored contract data for the transaction, processing, in a payment processor, a payment for the transaction on behalf of the buyer in response to the auditing function indicating that the payment is appropriate for the transaction, and assessing, in a fee assessment engine, a transaction processing fee against at least one of the parties to the transaction for which the payment is processed.

17. The method of claim 16, further including:

generating in the auditing engine, payment approval information, sending the generated payment approval information to a financial institution that effects the payment for the transaction, and assessing, in the fee assessment engine, the transaction processing fee for financing the payment for the transaction processed by the payment processor and providing at least a portion of the assessed transaction processing fee to the financial institution.

18. The method of claim 16, further including a step of classifying, in an expense classification engine, payments made for particular inventory items into expense classes based upon profile information for the buyer.

19. The method of claim 16, wherein the transaction requires buyer approval for the payment, providing an interface to the buyer for viewing and approving invoices pertaining to the transaction, and auditing, in the auditing engine, the transaction in response to buyer approval for the transaction.

20. The method of claim 16, wherein the inventory data is stored as data organized in an itemized catalog or list.

21. An automated transaction processing system for processing electronic transaction data for transactions involving buyers and providers of merchant offerings and pertaining to an inventory of items to which the merchant offerings apply, the system comprising:

a data storage arrangement that stores, for each of the buyers:
  buyer-specific profile data,
  at least one set of contract data that defines a business relationship established between the buyer and at least one of the providers, and
  at least one set of inventory data including an itemized list of tangible goods or property of the buyer; and a transaction processor circuit arrangement configured to correlate each of a plurality of received sets of the transaction data with profile data for one of the buyers, one of the sets of contract data and at least one of tangible goods or property of the buyer as identified in the one of the sets of inventory data, the transaction processor arrangement including:

an auditing engine configured to audit each received set of transaction data according to the correlated profile data, by using the correlated contract data and inventory data as inputs to determine a condition of payment authorization on behalf of the buyer, for a transaction to which the transaction data applies, a payment processor configured to generate electronic payment data for the transaction on behalf of the buyer in response to the determined condition of payment authorization indicating that payment is appropriate for the transaction, and a fee assessment engine configured to assess a transaction processing fee against at least one of the parties to the transaction for which the electronic payment data is generated.

* * * * *